US012560543B2

(12) United States Patent
Isano et al.

(10) Patent No.: US 12,560,543 B2
(45) Date of Patent: Feb. 24, 2026

(54) AUTONOMOUS MONITORING SYSTEM

(71) Applicant: CANON VIRGINIA, INC., Newport News, VA (US)

(72) Inventors: Taisuke Isano, Utsunomiya (JP); Connor Leschinsky, Hampton, VA (US); Hesham Elsaghir, Williamsburg, VA (US); Leonard Pascual, Chesapeake, VA (US); Thomas Wheeless, Hampton, VA (US); Paul Risque, Williamsburg, VA (US)

(73) Assignee: CANON VIRGINIA, INC., Newport News, VA (US)

( * ) Notice: Subject to any disclaimer, the term of this patent is extended or adjusted under 35 U.S.C. 154(b) by 0 days.

(21) Appl. No.: 17/272,079

(22) PCT Filed: Aug. 28, 2019

(86) PCT No.: PCT/US2019/048602
§ 371 (c)(1),
(2) Date: Feb. 26, 2021

(87) PCT Pub. No.: WO2020/047121
PCT Pub. Date: Mar. 5, 2020

(65) Prior Publication Data
US 2021/0282331 A1 Sep. 16, 2021

Related U.S. Application Data

(60) Provisional application No. 62/818,432, filed on Mar. 14, 2019, provisional application No. 62/725,137, filed on Aug. 30, 2018.

(51) Int. Cl.
| | |
|---|---|
| *G01N 21/64* | (2006.01) |
| *A01G 9/24* | (2006.01) |

(Continued)

(52) U.S. Cl.
CPC ......... *G01N 21/6486* (2013.01); *A01G 9/249* (2019.05); *G06V 20/52* (2022.01);
(Continued)

(58) Field of Classification Search
CPC . A01G 9/249; A01G 9/26; A01G 9/14; A01G 27/003; A01G 7/045
See application file for complete search history.

(56) References Cited

U.S. PATENT DOCUMENTS

| | | | | | |
|---|---|---|---|---|---|
| 3,688,676 | A | * | 9/1972 | Cruickshank | .......... G03B 15/00 396/428 |
| 4,255,897 | A | * | 3/1981 | Ruthner | .................. A01G 9/24 47/DIG. 6 |

(Continued)

FOREIGN PATENT DOCUMENTS

| | | |
|---|---|---|
| AU | 2005310343 A1 | 6/2006 |
| CN | 102550014 A | 7/2012 |

(Continued)

*Primary Examiner* — Joshua D Huson
*Assistant Examiner* — Spencer T Callaway
(74) *Attorney, Agent, or Firm* — Canon U.S.A., Inc., IP Division

(57) ABSTRACT

A system for monitoring vegetation in a predetermined space includes an image capturing unit, a lighting unit, a rail unit on which the image capturing unit and lighting unit move, wherein, in a case where a lighting condition of the predetermined space is a first lighting condition, the image capturing unit performs image capturing of the vegetation, and wherein, in a case where the lighting condition of the predetermined space is a second lighting condition, different from the first lighting condition, the image capturing unit does not perform image capturing.

8 Claims, 12 Drawing Sheets

(51) Int. Cl.
  A01G 9/26   (2006.01)
  G06V 20/52   (2022.01)
  H04N 7/18   (2006.01)
(52) U.S. Cl.
  CPC ............. H04N 7/183 (2013.01); H04N 7/188 (2013.01); A01G 9/26 (2013.01)

(56) References Cited

U.S. PATENT DOCUMENTS

| | | | | |
|---|---|---|---|---|
| 4,441,145 A * | 4/1984 | Antkowiak | ............. | F21V 21/34 |
| | | | | 362/384 |
| 4,699,484 A | 10/1987 | Howell et al. | | |
| 5,130,545 A | 7/1992 | Lussier | | |
| 5,225,863 A * | 7/1993 | Weir-Jones | ............. | B66C 21/00 |
| | | | | 352/197 |
| 5,526,041 A | 6/1996 | Glatt | | |
| 6,834,960 B2 * | 12/2004 | Dbjay | ................... | G03B 37/00 |
| | | | | 352/53 |
| 7,937,891 B2 * | 5/2011 | Benfey | ................... | A01G 7/00 |
| | | | | 47/60 |
| 8,358,097 B2 * | 1/2013 | Cartwright | ............. | F21V 21/15 |
| | | | | 396/4 |
| 9,021,739 B2 * | 5/2015 | Koo | ........................ | A01G 7/045 |
| | | | | 47/58.1 LS |
| 10,368,497 B2 * | 8/2019 | McReynolds | ......... | A01G 7/045 |
| 10,597,896 B1 * | 3/2020 | Hamilton | ................ | E04H 15/10 |
| 10,755,443 B1 * | 8/2020 | Trundle | ................. | A01G 25/16 |
| 10,952,381 B2 * | 3/2021 | Millar | ................... | G06T 7/0014 |
| 10,986,789 B1 * | 4/2021 | Roberts | .................... | A01G 9/26 |
| 2005/0085941 A1 | 4/2005 | Overskeid et al. | | |
| 2008/0002049 A1 | 1/2008 | Saito | | |
| 2008/0052052 A1 | 2/2008 | Stearns et al. | | |
| 2009/0214324 A1 * | 8/2009 | Grinnell | ................. | A01G 9/143 |
| | | | | 414/467 |
| 2013/0155672 A1 * | 6/2013 | Vo | ........................... | F21V 21/15 |
| | | | | 362/382 |
| 2013/0307988 A1 | 11/2013 | Hansen | | |
| 2014/0376773 A1 | 12/2014 | Holtz | | |
| 2015/0204787 A1 | 7/2015 | Kramer et al. | | |
| 2016/0290912 A1 | 10/2016 | Kent et al. | | |
| 2017/0208296 A1 | 7/2017 | Diep | | |
| 2018/0035616 A1 * | 2/2018 | Wagner | ................. | C03C 17/009 |
| 2018/0228104 A1 | 8/2018 | Mirzeabasov et al. | | |
| 2018/0325051 A1 * | 11/2018 | De Mello Brandao | ...................... | |
| | | | | G06F 18/24133 |
| 2018/0359901 A1 * | 12/2018 | Millar | .................... | A01B 41/04 |
| 2019/0208932 A1 * | 7/2019 | Maddocks | ............. | A01G 9/028 |
| 2020/0229357 A1 * | 7/2020 | Spiro | ..................... | A01G 9/247 |

FOREIGN PATENT DOCUMENTS

| | | | |
|---|---|---|---|
| CN | 106163262 A | 11/2016 |
| EP | 2876880 A1 | 5/2015 |
| JP | H 8-37883 A | 2/1996 |
| JP | 2004140589 A | 5/2004 |
| JP | 2005-516868 A | 6/2005 |
| JP | 2007-6716 A | 1/2007 |
| JP | 2015-065965 A | 4/2015 |
| JP | 2015-195786 A | 11/2015 |
| JP | 2016051312 A | 4/2016 |
| JP | 2016-198055 A | 12/2016 |
| JP | 2016-202124 A | 12/2016 |
| JP | 2017-085989 A | 5/2017 |
| JP | 2017103763 A | 6/2017 |

* cited by examiner

AUTONOMOUS MONITORING SYSTEM

CROSS REFERENCE TO RELATED APPLICATIONS

This application is the National Phase of International Patent Application PCT/US2019/48602 filed Aug. 28, 2019, which claims the benefit of U.S. Provisional Patent Application 62/725,137 filed Aug. 30, 2018 and U.S. Provisional Patent Application 62/818,432 filed Mar. 14, 2019, both of which are hereby incorporated by reference herein in their entireties.

FIELD

The present disclosure relates to autonomous monitoring of plants/crops

BACKGROUND

As the world's population increases and the available amount of arable land decreases, it is becoming more difficult to meet the ever-growing demand for food. Recently, one proposed solution to the issue of producing sufficient amounts of food while available arable land decreases is the notion of vertical farming. Vertical farming is the practice of growing/producing food on vertically inclined surfaces. In other words, instead of growing/producing vegetables, etc. on a single level surface, such as a field or greenhouse, vegetables, etc. are grown/produced in vertically stacked layers/racks where such layers/racks are typically located within a contained area such as a shipping container, warehouse, etc. (see FIG. 1).

Like all other farmers, vertical farmers have to deal with issues such as pests, diseases and other environmental threats to their crops. Once plants/crops contract diseases, bacteria, mold, fungus etc., these threats can quickly spread. The rate of spreading is especially quick in an enclosed environment such a vertical farm. In order to consistently deliver quality crops in a substantial quantity, vertical farmers need to monitor the health of their plants/crops to avoid unnecessary waste. As with other farmers, vertical farmers need to recognize problems with their crops as early as possible.

In addition to monitoring the health of their crops, vertical farmers, just like other farmers, need to determine the best time to harvest their crops. This is typically done by measuring the growth (size) of crops. While in an outdoor environment, this can be accomplished, for the most part, quite easily, in a vertical farming environment, observing plant/crop growth can be challenging due to the physical structure of the vertical farm. For example, the height of the vertical farm, the distance between levels, etc.

Illumination in a vertical farm can vary between white light, blue light, red light, etc. Under certain lighting conditions, such as blue light or red light, inspecting for and determining of any diseases or damage of crops can be challenging.

What is needed is a monitoring system that enables farmers to easily monitor the health and growth of their plants/crops in a confined area such as a vertical farm.

SUMMARY

A system for monitoring vegetation in a predetermined space includes an image capturing unit, a lighting unit, a rail unit on which the image capturing unit and lighting unit move, wherein, in a case where a lighting condition of the predetermined space is a first lighting condition, the image capturing unit performs image capturing of the vegetation, and wherein, in a case where the lighting condition of the predetermined space is a second lighting condition, different from the first lighting condition, the image capturing unit does not perform image capturing.

This and other embodiments, features, and advantages of the present disclosure will become apparent upon reading the following detailed description of exemplary embodiments of the present disclosure, when taken in conjunction with the appended drawings, and provided claims.

BRIEF DESCRIPTION OF DRAWINGS

FIG. 9A is an example of a line graph illustrating two waveforms.

FIG. 9B is an example of a line graph illustrating a battery moving and charging periods.

FIG. 10 is a general high-level illustrative depiction of the processing of the monitoring system.

DESCRIPTION OF EXEMPLARY EMBODIMENTS

An aspect of the present disclosure provides a monitoring system to monitor the condition of plants/crops in vertical farming environment.

Figure 1:
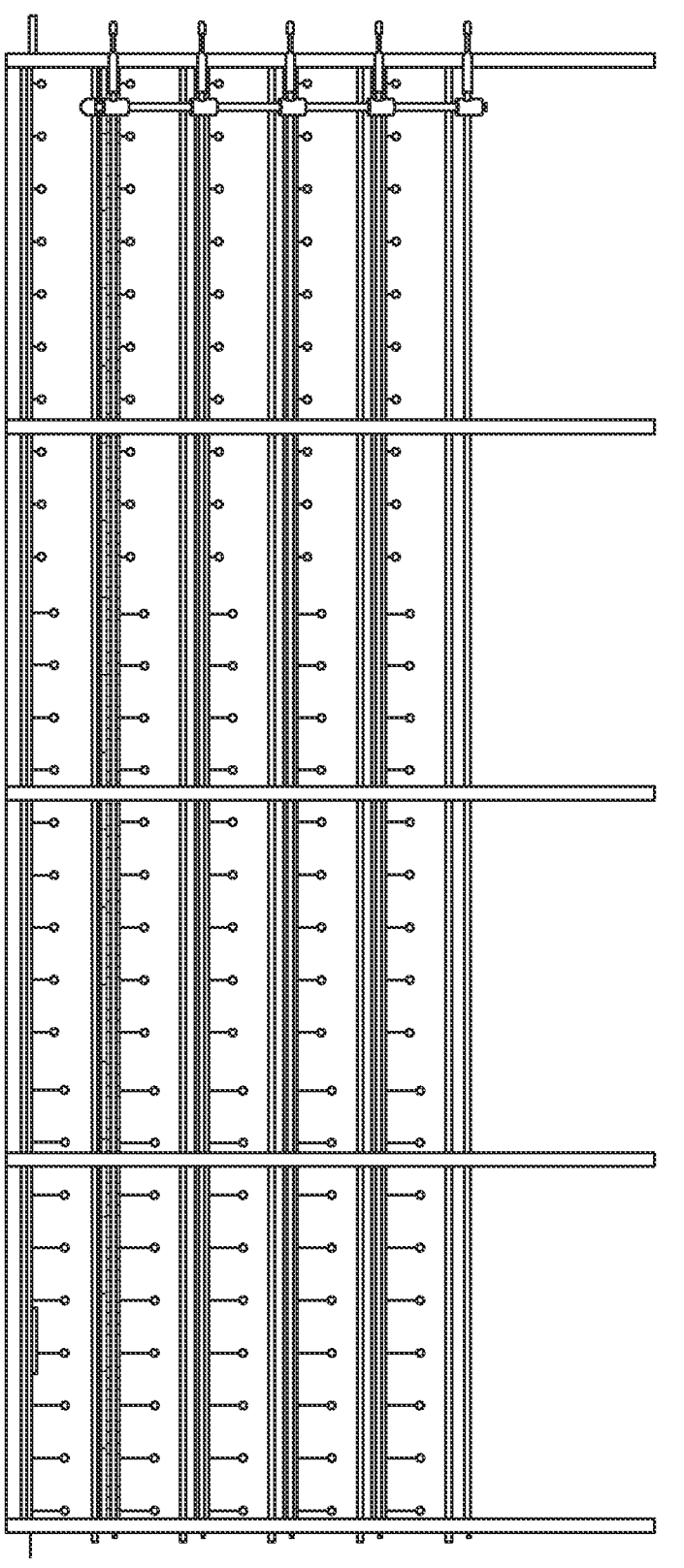
FIG. 1 is an exemplary structure of conventional vertical farm layers/racks.
Figure 2:
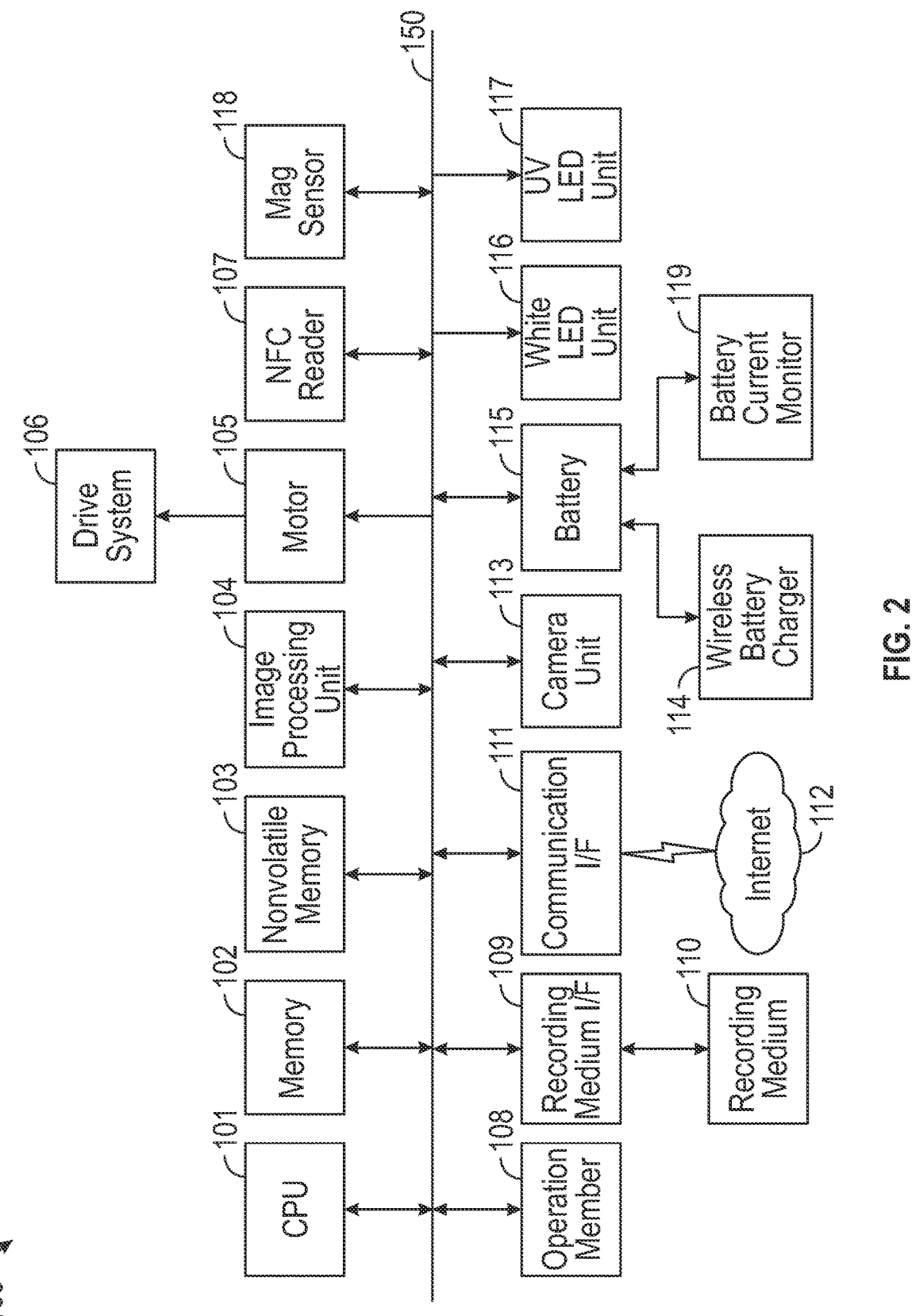
FIG. 2 is a block diagram illustrating a carriage unit.

Exemplary embodiments will be described in detail below with reference to the accompanying drawings. The following exemplary embodiments are merely examples and can be appropriately modified or changed depending on individual constructions and various conditions of applicable apparatuses. Thus, the disclosure is not seen to be limiting FIG. 2 is a block diagram illustrating an example of a configuration of a carriage unit 100, which is an example of an electronic apparatus according to an exemplary embodiment. A central processing unit (CPU) 101, a memory 102, a nonvolatile memory 103, an image processing unit 104, a motor 105, a NFC reader 107, an operation member 108, a recording medium interface (I/F) 109, a communication I/F 111, a camera unit 113, a wireless battery charger 114, a white LED unit 116 and a UV LED unit 117 are connected to an internal bus 150. Each of these components can exchange data and/or communicate with each other via the internal bus 150.

The CPU 101 is a processor that controls the carriage unit 100, based on, for example, a program or instructions stored in the nonvolatile memory 103 and by using the memory 102 as a working memory. The memory 102 can be a random access memory (RAM), but is not limited to being a RAM and any memory that would enable practice of the present exemplary embodiment is applicable. The nonvolatile memory 103 stores image data, audio data, other data, and various programs or instructions used by the CPU 101 to operate or execute various operations described below. The nonvolatile memory 103 includes, for example, a hard disk (HD), a read-only memory (ROM), or a flash memory.

The image processing unit 104, based on control by the CPU 101, performs various types of image processing on image data stored in the nonvolatile memory 103 and the recording medium 110, image data obtained via the communication I/F 111. The image processing includes analog-to-digital (A/D) conversion processing, digital-to-analog (D/A) conversion processing, encoding processing of image data, compression processing, decoding processing, enlarge-ment/reduction processing (resizing), noise reduction processing, and color conversion processing. The image processing unit 104 can be a dedicated circuit block for performing specific image processing. In another embodi-ment, depending on the type of image processing, the CPU 101 can perform the image processing based on a program without using the image processing unit 104.

The motor 105, based on motor control signal generated by the CPU 101, drives a drive system 106 including, but not limited to, tires, gears and a drive shaft.

The Near Field Communication (NFC) reader 107 reads a signal from NFC chips 206. In another exemplary embodi-ment, instead of an NFC reader/chips, a Radio Frequency ID (RFID) reader/marker can be used. In other exemplary embodiments, mechanical switches, optical sensing, audio sensing, etc., can be employed to achieve the same result as the use of NFC.

The Hall Effect Magnetic Sensor (hereinafter referred to as "mag sensor") 118 detects a magnet 120 located at a home station of carriage unit 100. Mag sensor 118 enables carriage unit 100 to stop and charge. Magnetic sensor 118 can be a mechanical switch, optical sensor or any other type of position sensor.

The operation members 108 can include an input device for accepting user operations. The operation members 108 can include a button, a dial, a joystick, etc.

The recording medium I/F 109 is configured so that a recording medium 110, such as a memory card, a compact disc (CD), and a digital versatile disc (DVD), etc., can be mounted thereon. The CPU 101 controls the recording medium I/F 109 to read data from the mounted recording medium 110 and write data to the recording medium 110. The communication I/F 111 is an interface for communicat-ing with an external apparatus or the Internet or the Intranet 112 to transmit and receive various types of data, such as a file or a command.

The camera unit 113 includes a lens group including a zoom lens and a focus lens, and an image sensor for converting an optical image into an electrical signal. The image sensor includes a charge-coupled device (CCD) sen-sor or a complementary metal-oxide-semiconductor (CMOS) sensor. The camera unit 113 can generate object image data.

The wireless battery charger 114 supplies power to the battery 15. The battery 115 supplies operational power to the above-described components via the internal bus 150. The battery current monitor 119 monitors a status of the battery 115.

The white light emitting diode (LED) unit 116 illuminates objects, e.g., plants/crops, etc., where the illuminated area is larger than the area captured by the camera unit 113.

The ultra violet (UV) LED unit 117 illuminates objects, e.g., plants/crops, etc., where the illuminated area is larger than the area captured by the camera unit 113.

Figure 3:
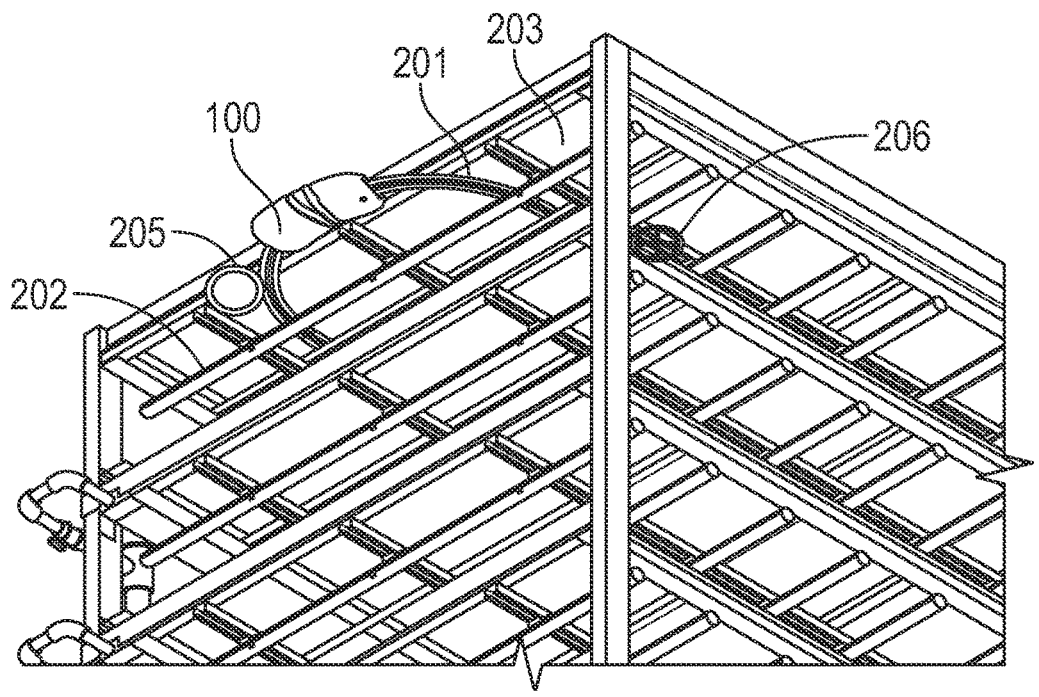
FIG. 3 is an illustrative view of a monitoring system.

FIG. 3 is an illustrative view of the monitoring system of the present exemplary embodiment. The carriage unit 100 includes a thin body, e.g., 3 cm in height. This height is merely an example and is not seen to be limiting. Rails 201 are installed between the top and LED 202 of rack 203, and the carriage unit 100 is connected to the rails. In another exemplary embodiment, the rails can be installed below LED 202.

The rack 203 can be a multi-layer or a single-layer structure. In a multi-layer structure, a carriage unit 100 can be installed on each layer, or a single carriage unit 100 can move from between layers.

The lighting in the vertical farming area provided by LED 202 can be programmed or otherwise cycled to turn on and off at pre-determined intervals to, for example, mimic day-light patterns. The lighting can also be controlled in opti-mized intervals to promote plant/crop growth or other desired results. In the present exemplary embodiment, the monitoring system is active while the lighting in the vertical farming area is off.

The carriage unit 100 travels on the rails 201 via the drive system 106. A charging station 205 is installed next to the rails 201. In the present exemplary embodiment, the charg-ing station 205 is a wireless charging system. A wireless charging system protects against a possible spark or a short circuit due that could occur due to, for example, water splashing from a planting bed.

Near field communication (NFC) chips 206 are installed next to the rails 201. The NFC chips 206 communicate with the NFC reader 107. The NFC chips 206 are installed at multiple locations along the rails 201. The locations are selected to enable image capture of all plants/crops on the rack 203.

Figure 4:
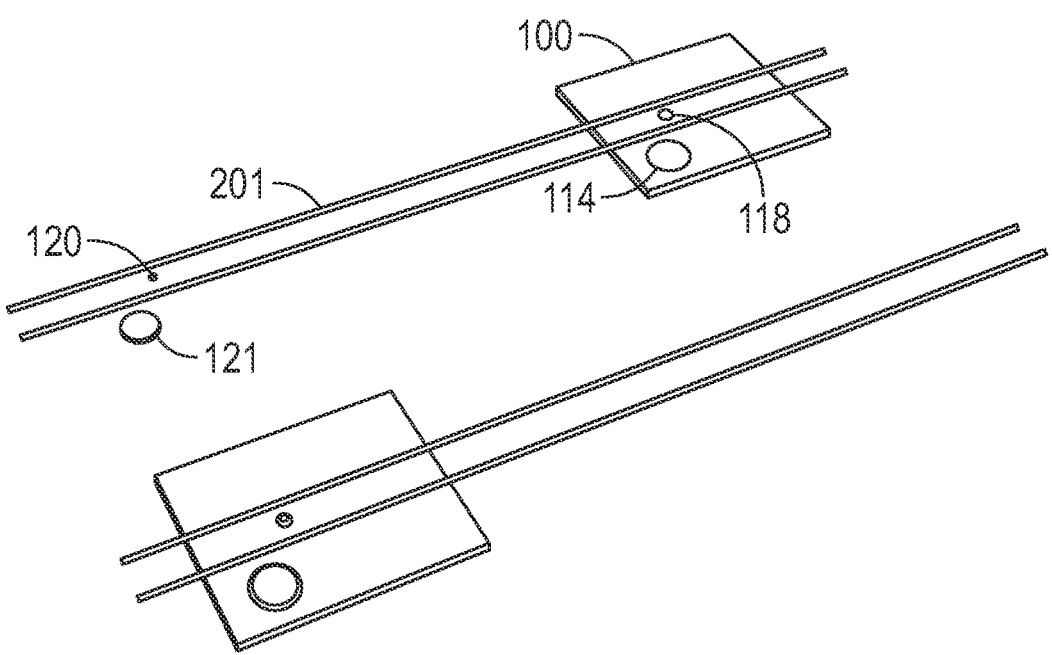
FIG. 4 illustrates the process of finding a home charging station.

FIG. 4 illustrates the process of finding a charging loca-tion. The mag sensor 118 is used to sense the presence of magnet 120 on the rails 201 at a location enabling the wireless battery charger 114 to lineup with a wireless transmitter 121. In other words, magnet 120 and wireless transmitter 121 are located in the charging station 205.

As carriage unit 100 moves on the rails 201, CPU 101 continuously monitors the mag sensor 118. When the mag sensor 118 approaches the magnetic field of the magnet 120, it sends an interrupt to the CPU 101, resulting in the CPU 101 issuing a command to motor 105 to stop the drive system 106. This enables the carriage unit 100 to stop precisely at charging station 205, enabling a max current transfer between the wireless transmitter 121 and the wire-less battery charger 114.

Using magnet 120, mag sensor 118, wireless charging, and NFC locators provides carriage unit 100 with protection against moisture and splash that is common in a vertical farming environment because they are sealed and do not require exposed or mechanical contacts.

Battery current monitor 119 provides CPU 101 with continues status reading of the battery 115. The battery current monitor 119 provides positive reading when battery 115 charging. This provides confirmation that the wireless battery charger 114 is functioning correctly. When carriage unit 100 is moving, the battery current monitor 119 provides negative reading, which indicates battery 115 is discharging. In the case of a mechanical failure, such as carriage unit 100 becoming stuck, battery current monitor 119 can provide a high negative reading, and CPU 101 can provide notification to a user of the error condition.

Figure 5:
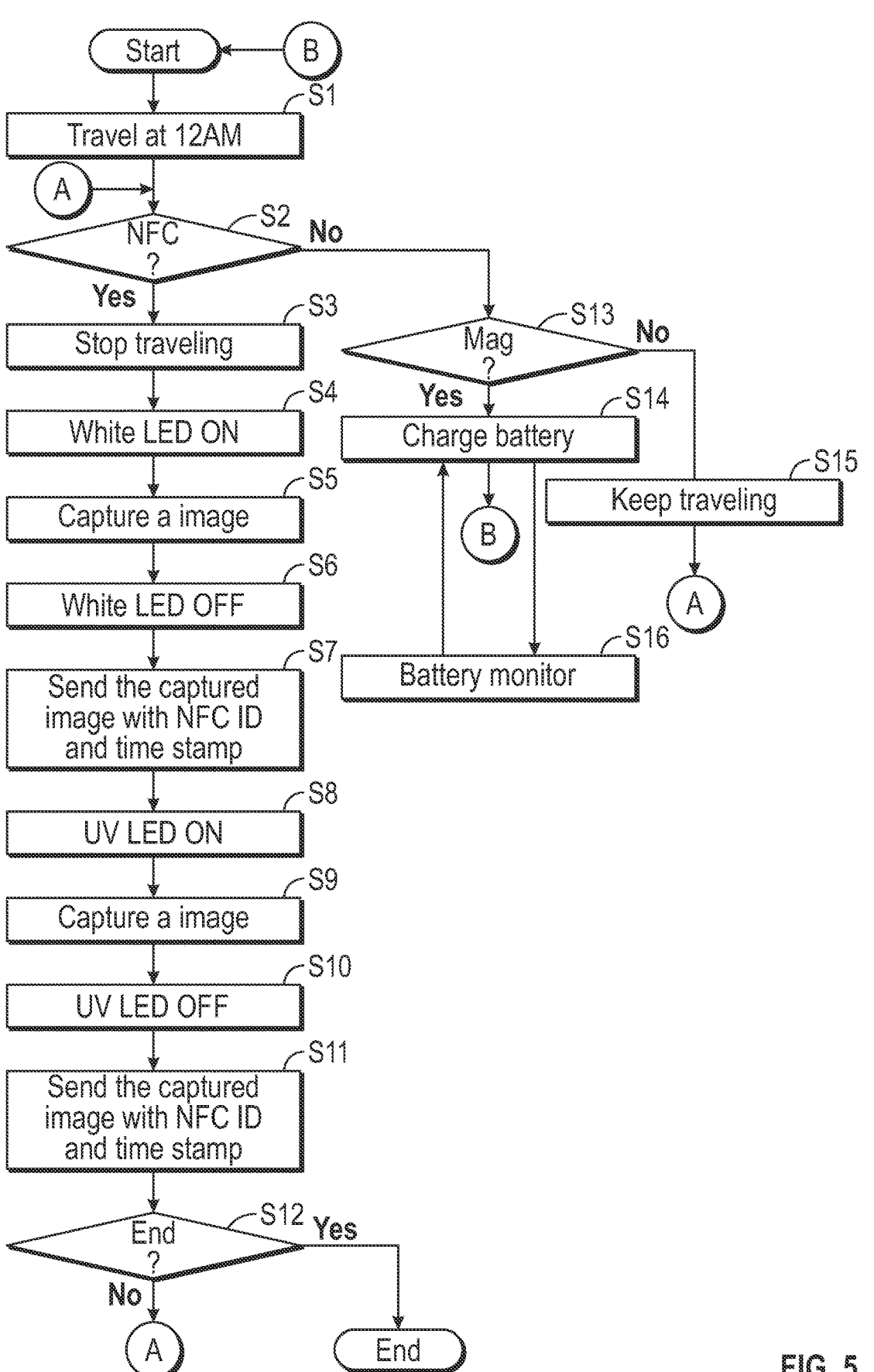
FIG. 5 is flowchart of the processing of the monitoring system.
Figures 9A, 9B, 10:
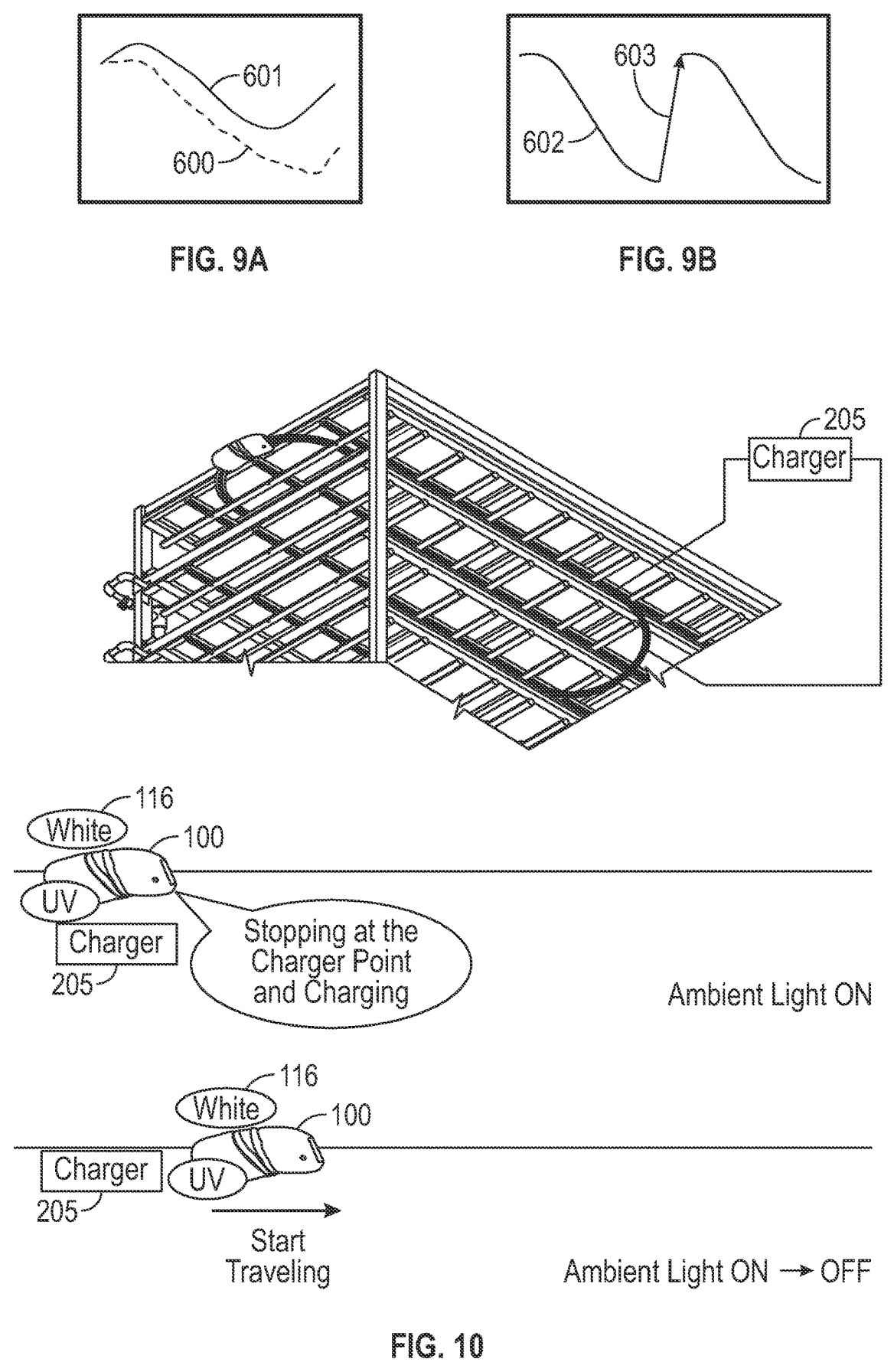
Figure 11:
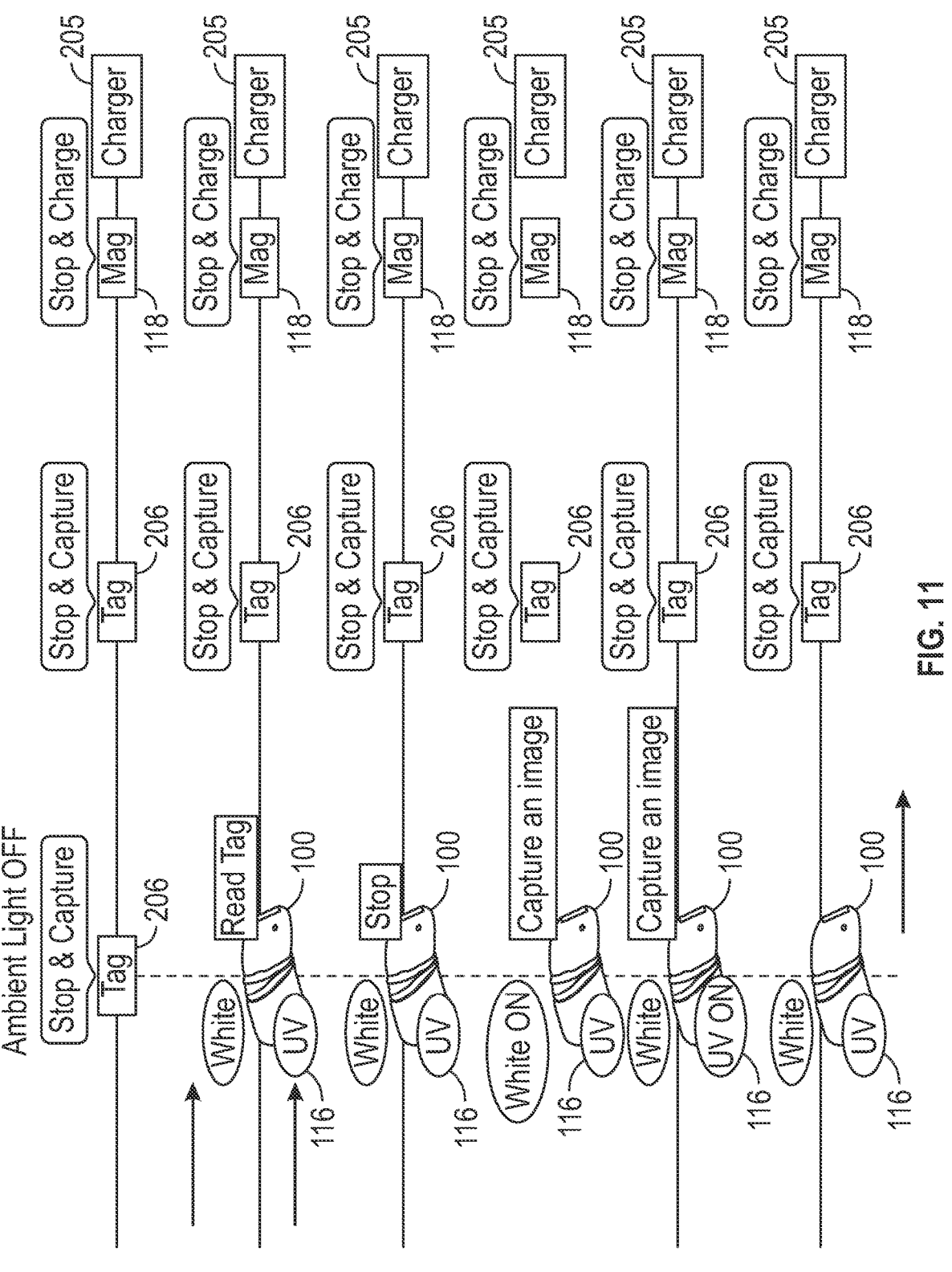
FIGS. 11, 12, and 13 are more detailed illustrative depictions of the processing of the monitoring system.
Figure 12:
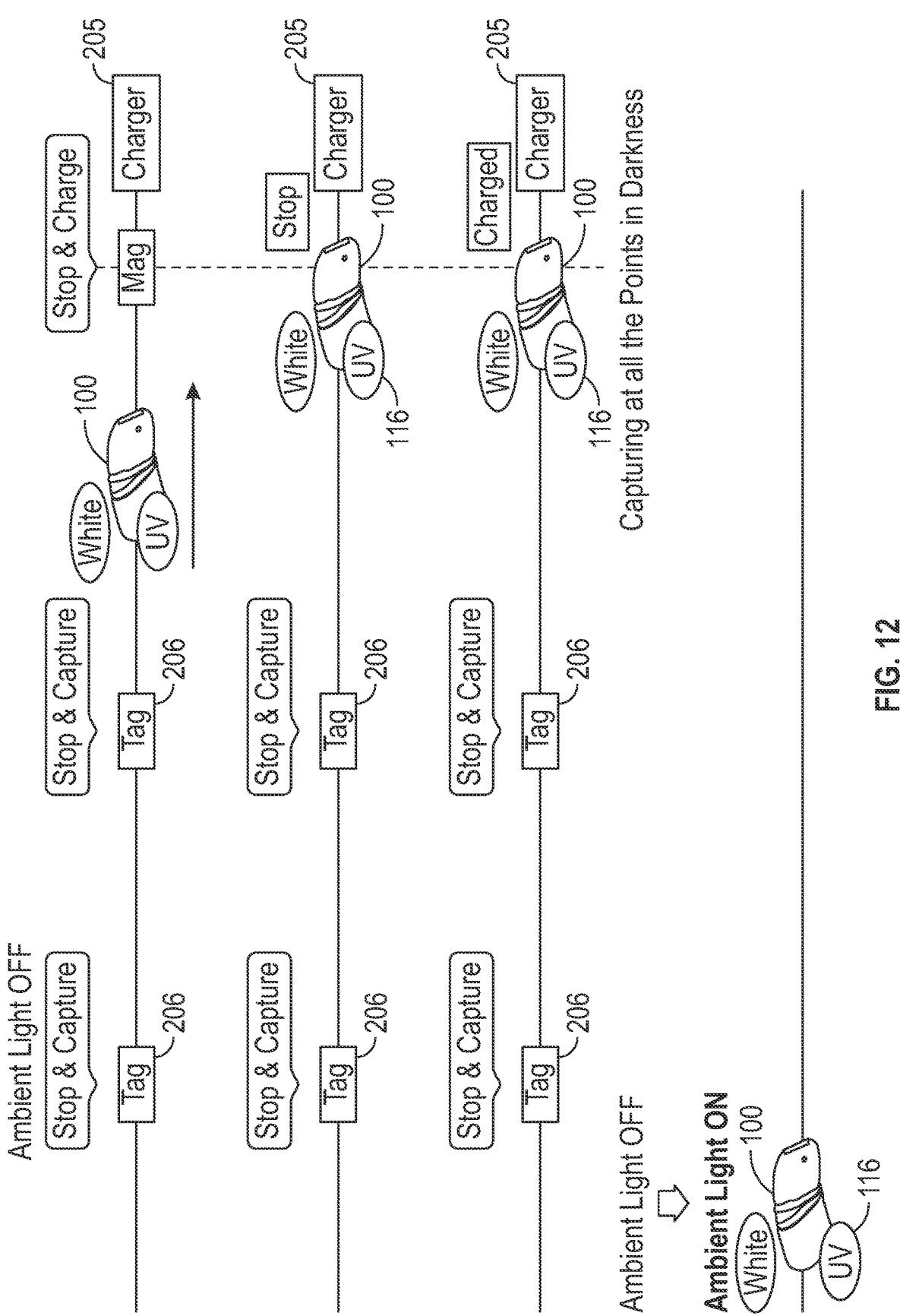
Figure 13:
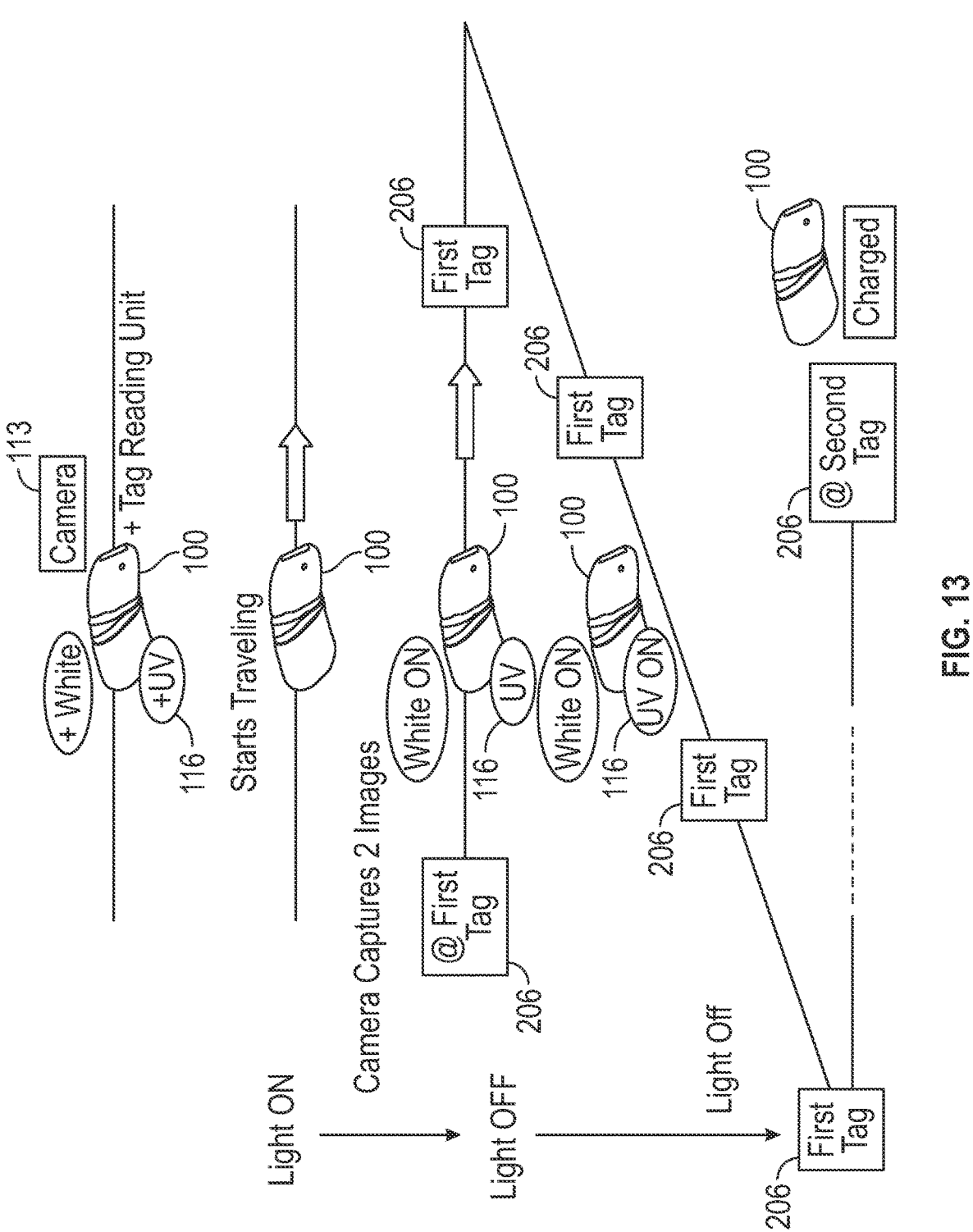

FIG. 5 is a flow chart of the processing of the monitoring system according to the present exemplary embodiment. The processing is realized by the CPU 101 extracting a program stored in the non-volatile memory 103, storing it in the memory 102, and executing it. FIG. 10 is a general high-level illustrative depiction of the processing illustrated in FIG. 5. FIGS. 11, 12, and 13 are more detailed illustrative depictions of the processing illustrated in FIG. 5.

Turning to FIG. 5, in S1, CPU 101 controls the carriage unit 100 to start traveling at a pre-determined time, e.g., 12:00 AM, on rails 201. The lighting provided by LED 202 is turned off at this time. In one exemplary embodiment, CPU 101 can control both LED 202, as well as white LED light unit 116 and UV LED light unit 117. In another exemplary embodiment, when the lighting provided by LED 202 is turned off, a light sensor (not illustrated) detects that the lighting has been turned off, and CPU 101 then controls the carriage unit 100 to start traveling.

In S2, it is determined if NFC reader 107 detects an NFC chip 206. If NFC reader 107 detects a signal of NFC chip 206, the processing proceeds to S3. If NFC chip 206 is not detected, the determination processing of S2 repeats.

In S3, carriage unit 100 stops traveling. Then, in 54, white LED unit 116 is turned on. Next, in S5, camera unit 113 captures an image of a plant/crop. The image is captured using a white LED so that the color of the plants/crops can be seen clearly. When the captured images are subsequently analyzed or displayed to enable checking a status of the plants/crops, any influences from the light are reduced because the analysis would be carried out under similar lighting color conditions. The captured images are analyzed using any known method of determining status of plants/crops.

Illumination of a vertical farm can vary between white light or other colors such as a mixture of blue and red lights, where the type of lighting depends on the type of plants/crops or technology being used. It can be very difficult to determine disease or damage that is color change of the plant/crop under illumination that excludes white light. Diseases of plants/crops or fungus on plants/crops can be recognized by white spots, black spots, etc. on plants/crops. Thus, images with true color are useful in achieving a correct diagnosis of diseases, etc.. All images captured by the carriage unit 100 are obtained under the same lighting condition every time and in every vertical farm environment. As such, color is not a factor, even white light, because lights of different spectrums are used in different environments.

In S6, the white LED unit 116 is turned OFF. In S7, the captured image, along with an NFC ID are sent to a remote server (not illustrated). An NFC ID is a unique NFC serial number used to identify the location and a time stamp of when the image is obtained. In S8, UV LED 117 unit is turned ON.

In S9, camera unit 113 captures an image of a plant/crop illuminated by UV LED unit 117. Illuminating plants/crops under UV light in the dark enables easier recognition of fungus and/or mold that may be present on the plants/crops due to an autofluorescence reaction to UV light. Fungus and/or mold can also be recognized by scattered light resulting from illumination with UV light. Camera unit 113 can detect the fluorescence and/or scattered light.

In S10, the UV LED unit 117 is turned OFF. In S11, the captured image, along with an with NFC ID and time stamp are sent to a remote server (not illustrated).

In S12, a determination is made whether NFC reader 107 detects an "END" signal from NFC chip 206. If the signal is detected, then the processing ends. If the signal is not detected, the processing returns to S2.

In S13, a determination is made whether the magnetic sensor 118 detects the magnet 120. If the magnet 120 is detected, the processing proceeds to S14. If the magnet 120 is not detected, the processing proceeds to S15

In S14, the carriage unit 100 is moved to/stops travelling at charging station 205. The battery 115 is then charged by wireless battery charger 114. When charging of battery 115 is complete, the processing returns to S1.

In parallel to the processing of S14, in S16, the CPU 101 checks an output value from the battery current monitor 119. In a normal status, the battery current monitor 119 outputs a positive value when the battery 115 is charged. If the battery current monitor 119 outputs a negative value when the battery 115 is charged, the CPU 101 determines that an error has occurred. The CPU 101 stops the current operation and provides a notification to a user of the error. In other words, the battery 115 can continue to be charged when two conditions are satisfied: the mag sensor 118 detects the magnet 120, and the battery current monitor 119 outputs positive value when the battery 115 is charged.

In S15, the carriage unit 100 is moved to the location of the next NFC 206. The processing then returns to S2.

In one exemplary embodiment, the images, NFC ID, and time stamp sent in S7 and S11 can be transmitted while the carriage unit 100 is traveling along the rails 201. In another exemplary embodiment, the images, NFC ID, and time stamp can be transmitted while the carriage unit 100 is at charging station 205. In still yet another exemplary embodiment, the captured images, NFC ID, and time stamp can be stored in nonvolatile memory 103, and when the carriage unit 100 reaches charging station 205, the stored image, NFC ID, and time stamp can be transmitted to the remote server and deleted from nonvolatile memory 103.

In order to monitor plants/crops, while a camera provides perhaps the best solution, the distance between a camera's lens and the plants/crops could be too close to capture a clear image due to the typical height, e.g., 60 cm, of each shelf in a vertical farm environment. Therefore, in order to obtain "top-view" images of plants/crops, the use of a wide-angle lens camera would provide a more usable image.

In an exemplary embodiment, two images are captured at each NFC chip 206 location before the LED 202 is turned back ON. While the LED 202 is described above as being turned OFF at 12:00 AM, this time is not seen to be limiting, and LED 202 can be turned off at any time. The length of time LED 202 is OFF can be automatically controlled or can be controlled by a user.

In the above description of S1, carriage unit 100 started traveling when LED 202 was OFF. In another exemplary embodiment, it is not necessary to turn LED 202 completely OFF to start moving carriage unit 100. If the lighting conditions are darker or lower than usual, effects can be obtained since less red lights, blue lights or white fluorescent lights would be included in the captured image.

In the above description of S3 and S13, carriage unit 100 stopped traveling. In another exemplary embodiment, the CPU 101 can decelerate the speed of the motor 105 instead of stopping the motor 105, thus enabling carriage unit 100 to slow down and continue moving without stopping. The camera unit 113 can capture images of plants/crops when carriage unit 100 moves at very slow speeds.

In the above description of S16, the CPU 101 checks an output value from the battery current monitor 119 when the battery 115 is charged. In another exemplary embodiment, the CPU 101 can check the output value when the battery 115 is discharged. In a normal status, the battery current monitor 119 outputs negative value when the battery 115 is discharged. If the battery current monitor 119 outputs positive value when the battery 115 is discharged, the CPU 101 determines that an error has occurred. The CPU 101 stops the operation and provides notification to a user of the error. The CPU 101 can determine a period in which the battery 115 is discharged using a sensor (not illustrated) for detecting the rotation state of the motor 105.

While the processing in the above exemplary embodiment(s) has been described as being performed by CPU 101, in another exemplary embodiment, the processing can be performed by a plurality of processing units that divide the processing among them.

Figure 6:
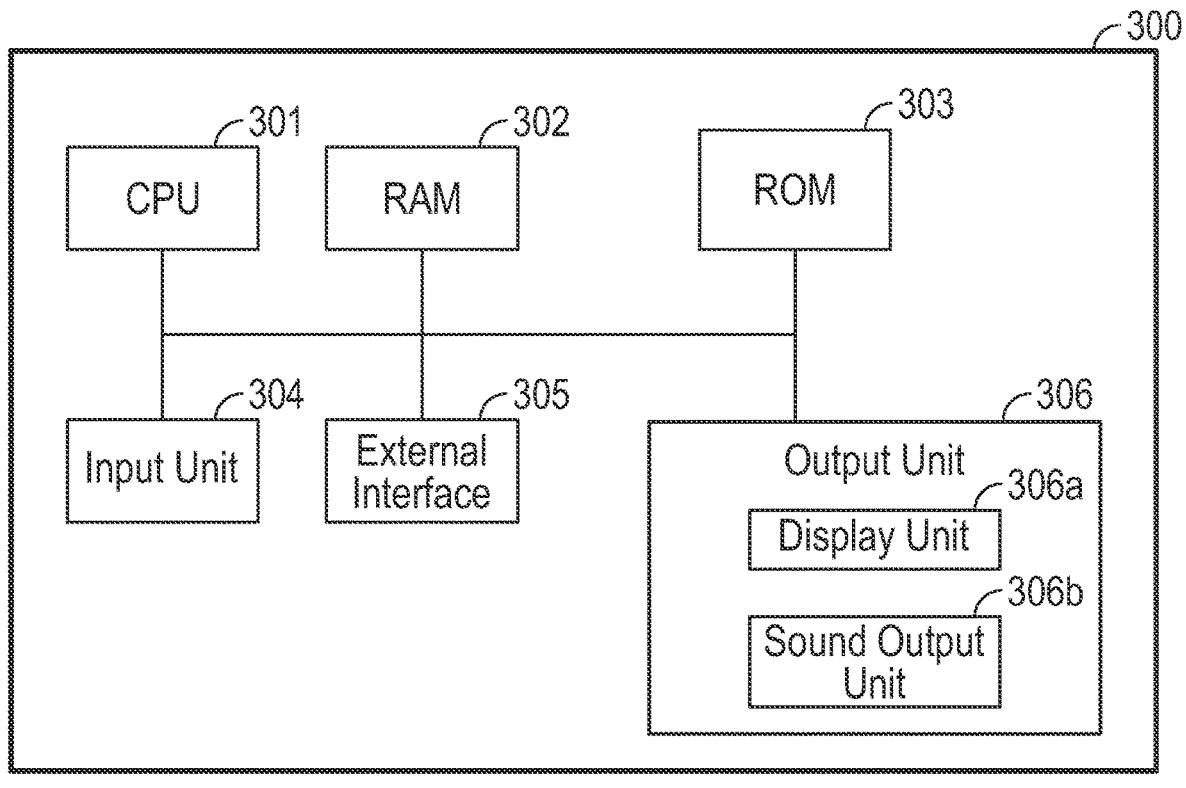
FIG. 6 illustrates a configuration of a computer for checking images of plants/crops

While the above-described exemplary embodiment(s) refer to the use of a camera, the present disclosure is not limited to this example. Any imaging apparatus that would enable practice of the present disclosure is applicable FIG. 6 illustrates a configuration of a computer 300 enabling a user to check images of plants/crops captured by the carriage unit 100. Computer 300 includes a CPU 301, a RAM 302, a ROM 303, an input unit 304, an external interface 305, and an output unit 306.

CPU 301 controls computer 300 via a computer program and data stored in the RAM 302 or ROM 303. Computer 300 can include one or more dedicated hardware components or a graphics processing unit (GPU), which is different from CPU 301, where the GPU or the dedicated hardware components can perform a part or all of the processes executed by CPU 301. An example of the dedicated hardware includes an application specific integrated circuit (ASIC), a field-programmable gate array (FPGA), a digital signal processor (DSP), etc.. RAM 302 temporarily stores the computer program or data read from the ROM 303, data supplied external from computer 300 via the external interface 305. ROM 303 stores the computer program and data that do not require modification.

Input unit 304 can be, for example, a joystick, a jog dial, a touch panel, a keyboard, a mouse, etc., receives user operations, and provides various instructions to CPU 301. The external interface 305 communicates with an external device, such as a server. The external interface 305 can communicate directly with the carriage unit 100. Communication with external devices can be performed via a wired interface using a local area network (LAN) cable, a serial digital interface (SDI) cable, etc., or can be via a wireless interface, such as a Wi-Fi-® connection. The output unit 306 can be, for example, a display unit 306a, such as a display, and a sound output unit 306b, such as a speaker, and displays a graphical user interface (GUI) and outputs a guiding sound so that a user can operate the computer 300.

Figure 7A:
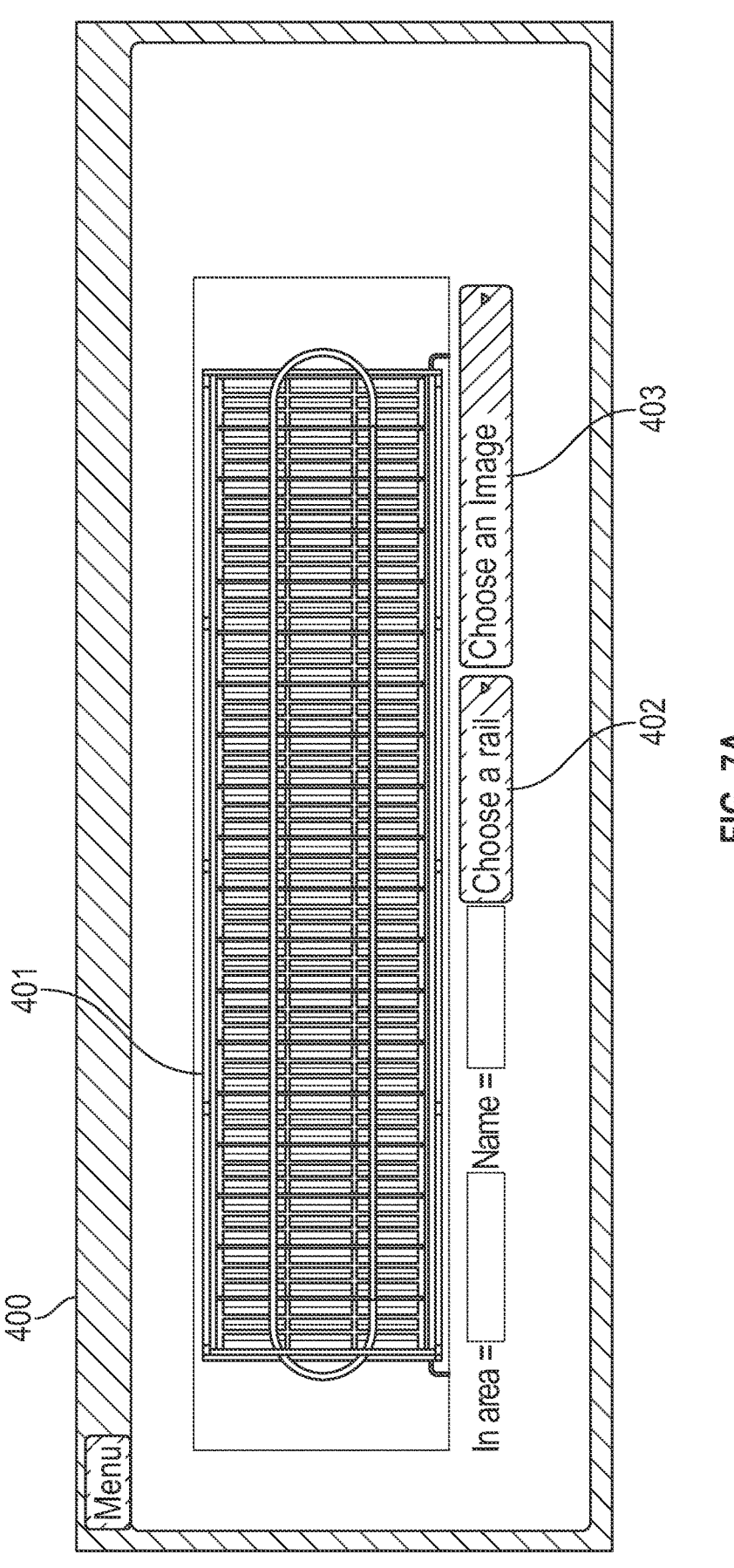
FIGS. 7A and 7B illustrates examples of displaying plant/crop images.
Figure 7B:
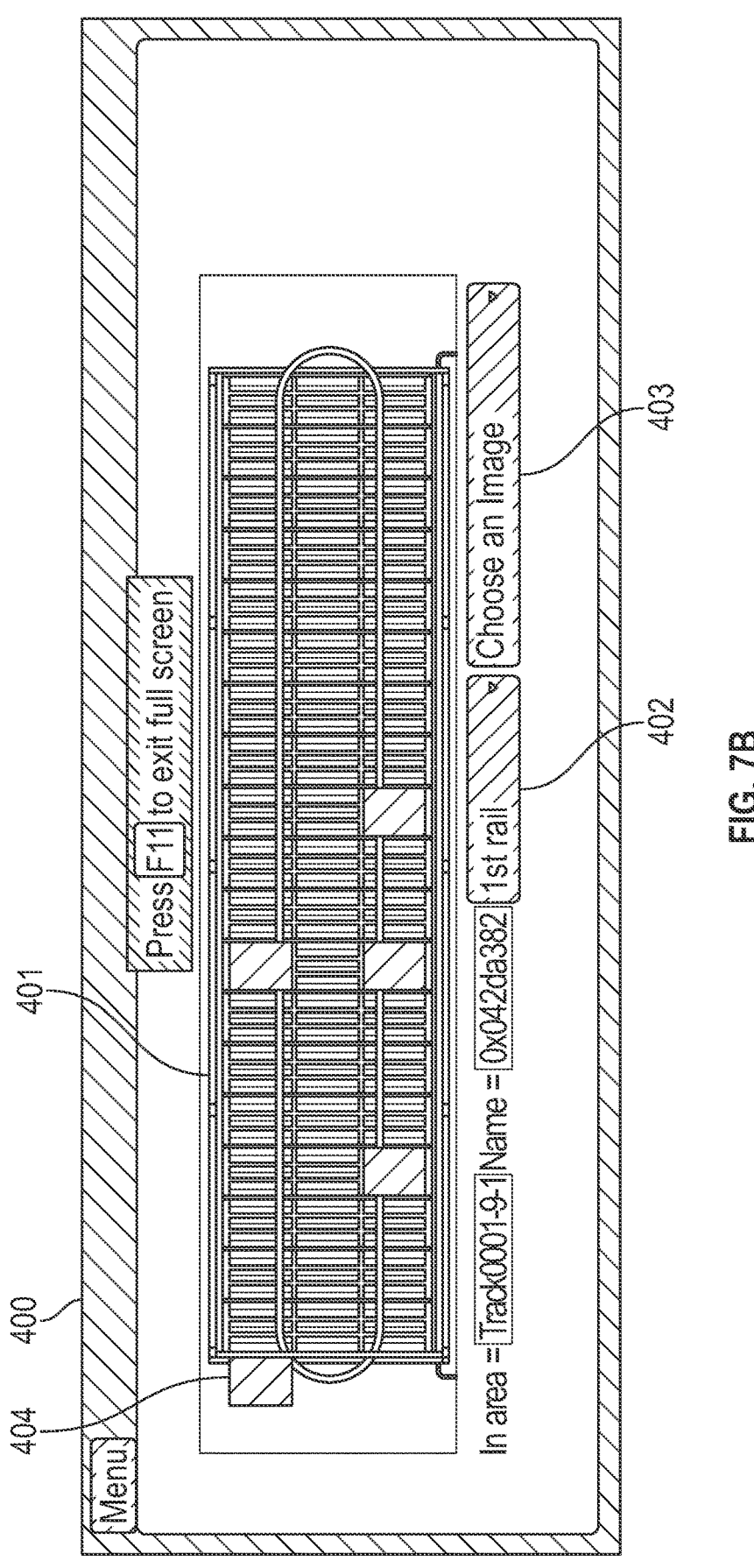

FIGS. 7A and 7B illustrate examples of an image displayed on the display unit 306a. FIGS. 7A and 7B illustrate a selection screen 400 in which a user can select a plant image displayed on the display unit 306a. In FIG. 7A, the selection screen 400 includes a rail image 401, a drop down list 402 "Choose a rail" and a drop down list 403 "Choose an image" in FIG. 7a. For description purposes, in this example, there is only one carriage unit 100 per one rail 201. The user can select one rail 201 from the drop down list 402.

In FIG. 7B, when the user selects "1st rail" from the drop down list 402, rectangles 404 appear on the rail image 401. Five rectangles 404 are on the rail image 401. The location of the rectangles 404 can be different for each rail 201. The rectangles 404 correspond to NFC chips 206, so there are five locations on the "1st rail" that the carriage unit 100 captures plant/crop images. The user can select one rectangle 404 from among the five rectangles 404. In other words, the user can select one image capturing location from among five image capturing locations. The user can select one plant/crop image from the drop down list 403. The drop down list 403 includes a plurality of plant/crop images captured by the carriage unit 100 at the selected image capturing location. The plurality of the plant/crop images differ with respect to image capture timing.

According to an exemplary embodiment, the plant/crop image is displayed in the following procedure:
  (a) user selects one rail 201 from the drop down list 402, and the rectangles 404 will appear on the rail image 401.
  (b) user selects one rectangle 404 from among two or more rectangles 404.
  (c) user selects one plant/crop image from the drop down list 403, and the selected plant/crop image is displayed.

The above-described procedure provides a method for displaying plant/crop images according to an exemplary embodiment. This procedure is not seen to be limiting, and any variation of the procedure that would enable displaying of the plant/crop images is applicable.

Figure 8:
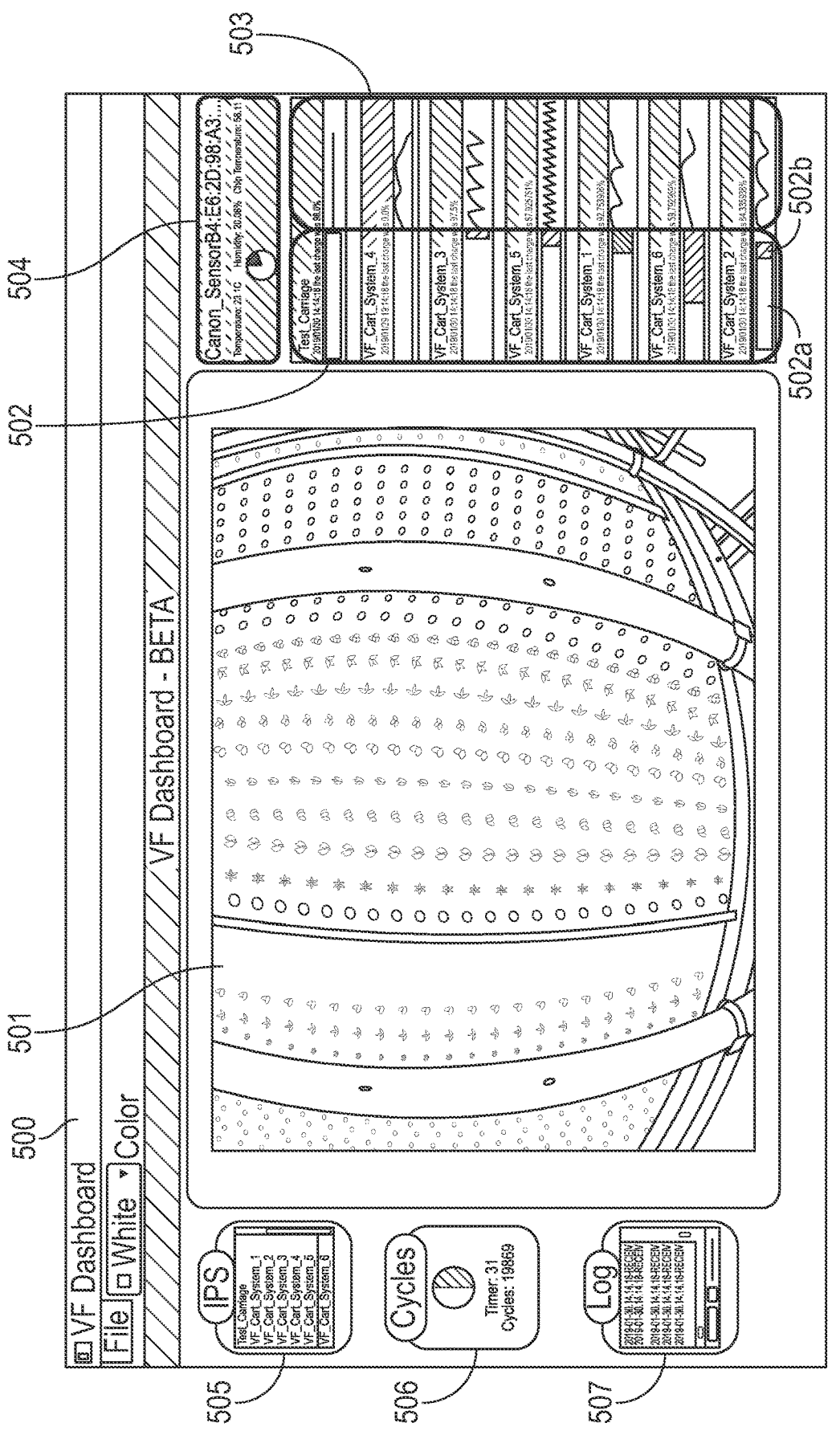
FIG. 8 illustrates an example of displaying plant/crop images for inspecting the plant/crop.

FIG. 8 is an example of displaying plant/crop images on the display unit 306a. More specifically, FIG. 8 illustrates a check screen 500 enabling a user to inspect the plant/crop image. The check screen 500 displayed when the user selects the plant/crop image in the selection screen 400. The check screen 500 includes a main section 501, a bar graph section 502, a line graph section 503, an environment information section 504, an ID information section 505, a cycle information section 506 and a log information section 507.

The main section 501 displays the plant/crop image captured by the carriage unit 100. The bar graph section 502 includes seven bar graphs and the line graph section 503 includes seven line graphs. One set of a bar graph and a line graph correspond to the battery 115 in one carriage unit 100. The bar graph indicates remaining percentage (remaining amount) and condition of the corresponding battery 115. The line graph indicates remaining percentage history of the corresponding battery 115. The bar graph section 502 and the line graph section 503 are described below.

The environment information section 504 indicates temperature, humidity and chip temperature. The temperature and the humidity are information for a user to understand the environment around the plants/crops. The temperature and the humidity are detected by a sensor located, for example, in the vertical farm or on the rails 201. The chip temperature is information to help prevent chip overheating. The chip is mounted on the carriage unit 100. The ID information section 505 indicates a list of IDs of each carriage unit 100. The ID of the selected carriage unit 100 is highlighted. The cycle information section 506 indicates a cycle in which information from the carriage unit 100 is updated. The log information section 507 indicates past information received by the computer 300 from the carriage unit 100.

The bar graph section 502 will now be described. Each of the bar graphs comprise two bar parts: a left part 502a and a right part 502b. A length of the left part 502a indicates current battery percentage. The length of the left part 502a can indicate voltage value or current value of the battery 115. A color or pattern of the right part 502b indicates a current condition of the battery 115. In the present example, the color of the right part 502b can turn green, red, or yellow. In a case where the color is green, this indicates a condition where the carriage unit 100 stops at the charging station 205, the battery 115 is charged, and the battery percentage is rising. In a case where the color is red, this indicates a condition where the carriage unit 100 moves and the battery percentage is decreasing. In a case where the color is yellow, this indicates a condition in which the battery 115 was previously charged or contact failure between the carriage unit 100 and the charging station 205 has occurred, and the battery percentage is not changed.

The line graph section 503 will now be described. The horizontal axis of each of the line graphs is the time axis, where the time axis indicates that time passes from the left to the right. The vertical axis of each of the line graphs is battery percentage. The line graph enables a user to check whether the battery 115 is charged properly at the charging station 205. The line graph enables a user to check the condition of the battery 115. These checks enable a user to determine whether the battery 115 is deteriorating.

While the line graph in FIG. 8 illustrates one waveform, the line graph can illustrate two or more waveforms. FIG. 9A is an example of the line graph illustrating two waveforms. There is an actual waveform 600 and an ideal waveform 601. The actual waveform 600 indicates actual percentage history of the battery 115. The ideal waveform 601 indicates ideal (virtual) percentage history for comparison. "Ideal" means that the battery 115 is charged properly and the battery 115 is not deteriorated. By comparing the actual waveform 600 with the ideal waveform 601, the user can easily check errors related to the battery 115. In other words, the ideal waveform 601 works as a reference.

Generally, a charging period in which the battery 115 is charged is often shorter than a moving period in which the battery 115 moves. Thus, the line graph can illustrate the waveform where the charging period is omitted. FIG. 9B is an example of the line graph including the moving period part 602 and the charging period part 603. Using such a display enables highlighting necessary information.

The check screen 500, as described above, is displayed when a user selects the plant/crop image in the selection screen 400. However, this configuration is not seen to be limiting. In another exemplary embodiment, the check screen 500 can automatically display a set of images, like a slide show from a specific day from all locations, to enable a user to see all images. The check screen 500 is a main screen while the selection screen 400 is a tool screen. The check screen 500 can always be displayed so that a user can check the plant/crop and battery conditions. The selection screen 400 is displayed only when a user uses the tool bar to check the plant(s)/crop(s) located in certain areas.

Next, a warning system will be described. The warning system notifies a user of a battery 115 error by displaying an image or message on the display unit 306*a*, by emitting sound from the sound output unit 306*b*, or by displaying an image/message and emitting a sound. In the present exemplary embodiment, the warnings are output based on following conditions:

| Warnings | Conditions |
| --- | --- |
| Level 1 | Although the carriage unit is moving, the battery percentage has not changed |
| Level 2 | The battery percentage has dropped to 20%. |
| Level 3 | The battery percentage consumed by moving the carriage unit one round on the rail is greater than the battery percentage charged at the charging station at one time |
| Level 4 | Both level 2 and level 3 conditions are met |

In the present exemplary embodiment, there are four warning levels. In a case of Level 1, the background color of a corresponding set of the bar graph and the line graph turns orange. A color of the background as well as a pattern of the background can change. In a case of Level 2, the display unit 306*a* displays an error image or an error message, or the sound output unit 306*b* emits an alarm sound. In a case of Level 3, the display unit 306*a* displays the error image or the error message, and the sound output unit 306*b* emits an alarm sound. In a case of Level 4, the carriage unit 100 does not move from the charging station 205 unless a user permits such a movement. However, the carriage unit 100 can continue to move without outputting warnings when there is a long time until the next movement timing, even if the battery percentage has dropped below 20%.

In addition to the above described exemplary embodiment, in another exemplary embodiment if the computer 300 does not receive the information from the carriage unit 100 at a timing defined in the cycle information section 506, the background color of a corresponding set of the bar graph and the line graph turns yellow. In a case where the carriage unit 100 is not responding over a network, the background color of a corresponding set of the bar graph and the line graph turns red. The warnings can be output based on information other than the battery percentage, such as the temperature or the humidity.

The above-described exemplary embodiment(s) provides a monitoring system for a vertical farm environment that can work while the vertical farm environment is dark and plants/crops are illuminated with white LED lights, thus enabling capturing of images under similar lighting conditions. In addition, the plants/crops can be illuminated using UV light to enable detection of fungus, mold, etc.

The above-described exemplary embodiment(s) provides a wireless power charging system that uses a magnetic sensor to enable a carriage with a wireless receiver to perfectly lineup with a wireless transmitter to provide an optimal charge current to a battery of the carriage. In addition, a current monitor enables monitoring of the battery, which provides that the carriage can confirm the charge location and ensure the carriage it is at an optimum location for maximum charging current.

What is claimed is:

1. A system for monitoring vegetation in a predetermined space, the system comprising:

a camera, wherein the camera comprises a wide-angle lens;

a carriage unit configured to move along a rail, the carriage unit including the camera to capture at least one image, the carriage unit being sealed;

a charging station configured to wireless charge a battery in the carriage unit;

a light source, comprising a first light source and a second light source, wherein the second light source provides UV light;

a light sensor configured to detect a lighting condition for illuminating the vegetation by the first light source; and a processor configured to control the camera and carriage unit and to determine varying lighting condition of the first light source and the second light source, wherein, when the light sensor detects that (1) the lighting condition of the first light source is darker than a predetermined brightness level or (2) the lighting condition of the first light source is off, then, the camera performs image capturing of the vegetation illuminated by the second light source different from the first light source, wherein a top view image of the vegetation is captured using the wide-angle lens; and when the light sensor detects the lighting condition is brighter than the predetermined brightness level, the camera does not perform image capturing of the vegetation illuminated by the second light source, the processor analyzes the captured images of the vegetation for the detected lighting condition and the camera performs subsequent image capturing of the vegetation in the same lighting condition and detects disease or damage of the vegetation, the processor cycles a lighting environment to turn on and off lighting at pre-determined intervals or configured in optimized intervals, the camera performs image capturing while the lighting environment is off, wherein the light sensor detects a dark environment, the camera remains active and is configured to perform image capturing in the dark environment, and the processor controls the carriage unit to start traveling at one or more predetermined time or to start traveling based on the detected lighting condition, the camera in the carriage unit performs image capturing at locations when stop traveling or during a continuous traveling, where at least one stop traveling location enables wireless charging from the charging station configured to charge a battery in the carriage unit.

2. The system according to claim 1, wherein the first light source emits the first light and the second light source emits the second light.

3. The system according to claim 2, wherein the first light that is emitted by the first light source is an ambient light.

4. The system according to claim 1, wherein the camera captures a condition of autofluorescence reaction excited by the UV light.

5. The system according to claim 1, further comprising a controller, wherein, in accordance with the detection by the light sensor that the lighting condition of the first light source is darker than a predetermined brightness level or the lighting condition of the first light source is off, the camera captures a first captured image of the vegetation illuminated by the UV light and a second captured image of the vegetation illuminated by a white light, and the controller determines a condition of the vegetation based on an analysis of the first captured image and the second captured image.

6. The system according to claim 1, wherein the carriage unit includes an RF reader configured to read a signal from at least one RF chip, a magnetic sensor configured to detect at least one magnet, a motor configured to drive the carriage unit, and a battery monitor configured to output a positive value when the battery is charged and output a negative value when the battery is discharged, wherein in a case where the battery monitor outputs the negative value even though the charging unit charges the battery, provide an error notification.

7. The system according to claim 1, wherein in a case where the RF reader reads the signal from the at least one RF chip while the motor drives the carriage unit to move along the rail, the processor stops the motor and controls the camera to capture the at least one image, and wherein in a case where the magnetic sensor detects the at least one magnet while the motor drives the carriage unit to move along the rail, the processor stops the motor at the charging station to wireless charge the battery in the carriage unit.

8. The system according to claim 1, wherein the carriage unit is sealed with no exposed mechanical contacts to provide protection against moisture in a farming environment.

* * * * *